US011222010B2

(12) United States Patent
Semlani

(10) Patent No.: US 11,222,010 B2
(45) Date of Patent: *Jan. 11, 2022

(54) VALUE TRANSFORMATIONS THAT ENABLE DATA SERVICES TO UPDATE DATA OBJECTS

(71) Applicant: salesforce.com, inc., San Francisco, CA (US)

(72) Inventor: Latesh Semlani, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,320

(22) Filed: Sep. 7, 2017

(65) Prior Publication Data

US 2018/0025048 A1 Jan. 25, 2018

Related U.S. Application Data

(63) Continuation-in-part of application No. 15/217,002, filed on Jul. 22, 2016, and a continuation-in-part of application No. 15/216,538, filed on Jul. 21, 2016.

(51) Int. Cl.

| | |
|---|---|
| *G06F 16/23* | (2019.01) |
| *G06F 16/2455* | (2019.01) |
| *G06Q 10/10* | (2012.01) |
| *G06F 16/25* | (2019.01) |
| *G06F 3/0484* | (2013.01) |

(52) U.S. Cl.
CPC ...... *G06F 16/2379* (2019.01); *G06F 16/2455* (2019.01); *G06F 16/258* (2019.01); *G06Q 10/101* (2013.01); *G06F 3/04842* (2013.01)

(58) Field of Classification Search
CPC ................. G06F 17/30345; G06F 17/30292
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |

(Continued)

OTHER PUBLICATIONS

U.S. Appl. No. 13/986,251, filed Apr. 16, 2013.

*Primary Examiner* — Aleksandr Kerzhner
*Assistant Examiner* — Aryan D Toughiry
(74) *Attorney, Agent, or Firm* — Dergosits & Noah LLP; Todd A. Noah

(57) ABSTRACT

A system receives a user selection of a data object, and outputs the data object to a user device. The system receives a user selection of a data service, and outputs a data service object associated with the data service to the user device. The system receives a user selection of a data field associated with the data object and the data service field, and stores metadata that maps between the data field and the data service field. The system receives a user input, and creates a transformation object that transforms a value associated with the data service field into a value associated with the data field. The system updates an instance of the data object by using the metadata to send request data to the data service, using the metadata to receive response data from the data service, and applying the transformation object.

20 Claims, 4 Drawing Sheets

(56) References Cited

U.S. PATENT DOCUMENTS

| | | |
|---|---|---|
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0044165 A1 | 2/2005 | O'Farrell et al. |
| 2005/0050555 A1 | 3/2005 | Exley et al. |
| 2005/0091098 A1 | 4/2005 | Brodersen et al. |
| 2007/0260628 A1* | 11/2007 | Fuchs .............. G06F 16/29 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0282100 A1* | 9/2014 | Beechuk .............. G06F 40/14 |
| | | 715/753 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0205846 A1 | 7/2015 | Aldridge et al. |
| 2015/0268949 A1* | 9/2015 | Huber .............. G06F 9/44521 |
| | | 717/120 |
| 2016/0224615 A1 | 8/2016 | Rehman et al. |
| 2016/0234267 A1 | 8/2016 | Hebbar |
| 2016/0371320 A1* | 12/2016 | Nandagopal ........ G06F 16/958 |
| 2017/0344745 A1* | 11/2017 | Wadley .............. H04L 63/10 |

* cited by examiner

US 11,222,010 B2

VALUE TRANSFORMATIONS THAT ENABLE DATA SERVICES TO UPDATE DATA OBJECTS

CLAIM OF PRIORITY

This application is a continuation-in-part application of U.S. application Ser. No. 15/216,538, filed Jul. 21, 2016 and U.S. application Ser. No. 15/217,002, filed Jul. 22, 2016, which are incorporated in their entirety herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects that represent each person and/or organization that may be able to help in achieving a goal. Each object may consist of a few standard fields, such as first name, last name, job title, industry, company name, address, telephone number, e-mail address, fax number, mobile phone number, number of employees, company revenue, and company industry category. There is significant value in enriching such a database with data available from a data service.

However, data for the same entity may be represented very differently by different data sources. For example, some data sources may have data that needs to be merged when communicating data with other data sources, such as a pair of data fields named "street1" and "street2" that need to be merged into a single data field street. In another example, some data sources may have data that needs to be split when communicating data with other data sources, such as when a data field "name" contains the full name of a person, and needs to be split into the pair of data fields for first_name and last_name. In yet another example, some data sources may have data that needs to be matched when communicating data with other data sources, such as when one data source has a data field for zip code while another data source has a data field for postal code. Other examples of potential data conflicts are between a toll-free business phone number and a regular business phone number, between a business email address and a personal email address, and between a business mailing address and a personal mailing address. Therefore, before importing data from a data service into a database, some data may need to be mapped. A database provider may or may not create maps to communicate data between the database provider's data objects and a data service. Database users may create custom data objects to store non-standard information. Consequently, a database user may have to create their own code that maps between the data fields of a data object and the data fields used by a data service.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
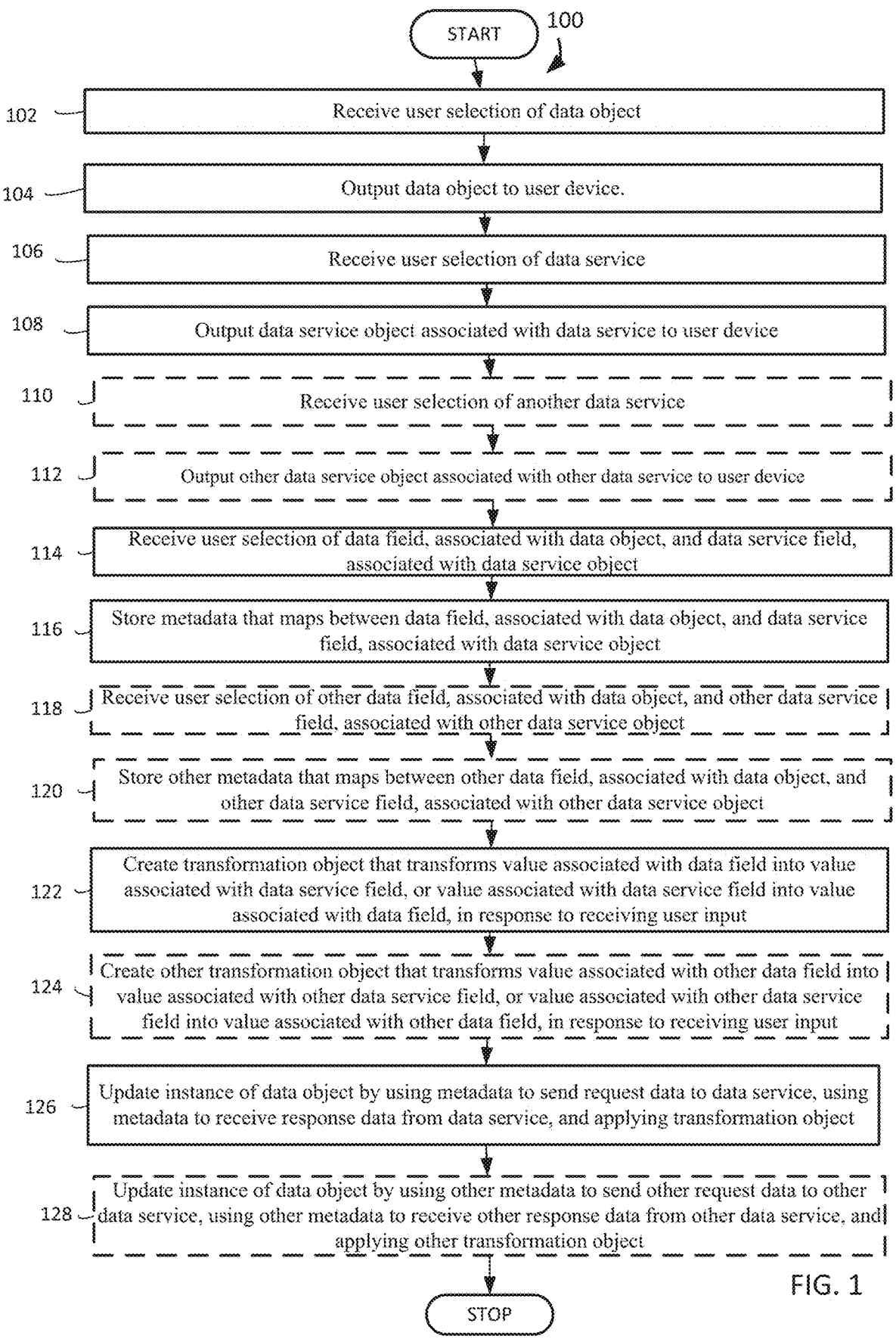
FIG. 1 is an operational flow diagram illustrating a high-level overview of a method for value transformations that enable data services to update data objects, in an embodiment.

In accordance with embodiments described herein, there are provided systems and methods for value transformations that enable data services to update data objects. A system receives a user selection of a data object, and outputs the data object to a user device. The system receives a user selection of a data service, and outputs a data service object associated with the data service to the user device. The system receives a user selection of a data field associated with the data object and the data service field associated with the data service object, and stores metadata that maps between the data field and the data service field. The system receives a user input, and creates a transformation object that transforms a value associated with the data field into a value associated with the data service field, or the value associated with the data service field into the value associated with the data field. The system updates an instance of the data object by using the metadata to send request data to the data service, using the metadata to receive response data from the data service, and applying the transformation object.

For example, a user selects a contact object that stores data for business contacts because the user wants the contact data updated, and a database system outputs the contact object to the user's display screen. The user selects Data-.com®, a web-data extraction service or web scraping service, and the database system outputs a data service object for Data.com®. The user selects the company industry field of the contact object and the employer industry field of the Data.com® data service object, and the database system stores metadata that maps between the company industry field and the employer industry field. The user inputs Apex code that transforms the numeric values of the employer industry field into the text values of the company industry field. The user requests Data.com® to update the contact data, and the database system updates the contact data for Joe Smith of Acme.com by using the metadata to send data identifying Joe Smith to Data.com®, and to receive data, including the employer industry value of "7372" for Acme Corporation, from Data.com®. Then the database system applies the Apex code to transform the employer industry value of 7372 for Acme Corporation into the company industry value of "Prepackaged Software" for Acme Corporation, and updates the contact data for Joe Smith of Acme.com with the company industry value of Prepackaged Software for Acme Corporation. The database user quickly and easily creates metadata that maps between the fields of a data object and the data fields used by a data service, and quickly and easily creates code that transforms the values between different types of fields.

Systems and methods are provided for value transformations that enable data services to update data objects. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for value transformations that enable data services to update data objects will be described with reference to example embodiments. The following detailed description will first describe a method for value transformations that enable data services to update data objects. Next, example objects for value transformations that enable data services to update data objects are described.

While one or more implementations and techniques are described with reference to an embodiment in which value transformations enable data services to update data objects is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 2:
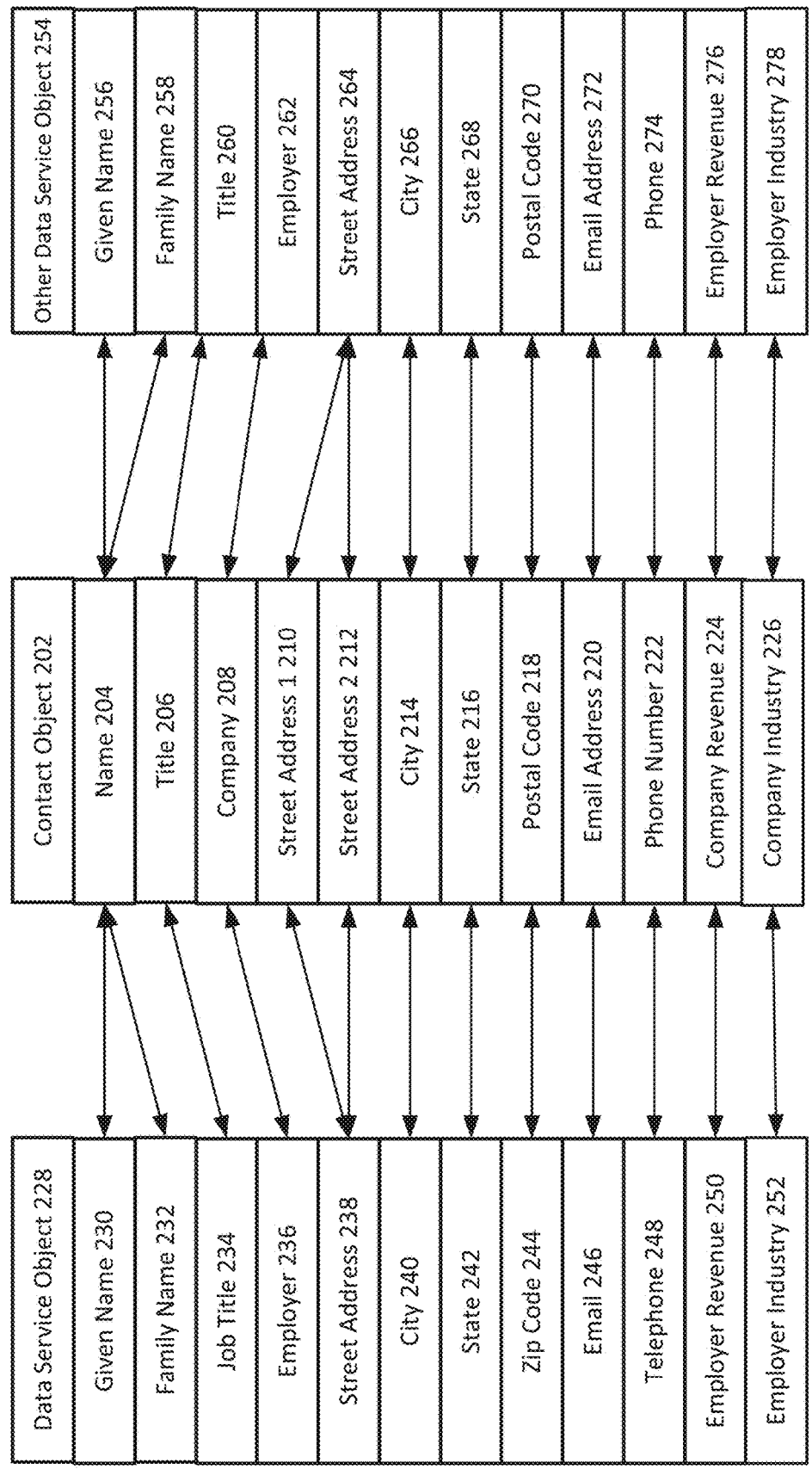
FIG. 2 illustrates example objects for value transformations that enable data services to update data objects, in an embodiment.

FIG. 1 is an operational flow diagram illustrating a high-level overview of a method 100 for value transformations that enable data services to update objects. The examples of objects which are described below in reference to FIG. 1 are depicted in FIG. 2 and described below in reference to FIG. 2.

First, a system receives a user selection of a data object, block 102. For example and without limitation, this can include a user selecting a contact object that stores data for business contacts from a list of data objects displayed by a database system on the user's display screen, because the user wants the contact data updated. An example of a contact object is depicted in FIG. 2 and described below in reference to FIG. 2. Examples of other data objects include a lead object, an opportunity object, and an account object. A user selection can be the action or fact of a person who operates a computer carefully choosing something as being the most suitable. A data object can be a construct that provides a description of information that may be used by a computer.

After receiving a selection of a data object, the system outputs the data object to a user device, block 104. By way of example and without limitation, this can include the database system outputting the contact object, which may include all of the contact objects fields, to the user's display screen. An example of contact object fields are depicted in FIG. 2 and described below in reference to FIG. 2. A user device can be a piece of electronic equipment that is operated by a person.

Having output a selected data object, the system receives a user selection of a data service, block 106. In embodiments, this can include the user selecting Data.com®. A data service can be an entity involved in providing and receiving information. A third-party data service can be an entity other than the two primary entities involved in providing and receiving information.

Having received a selection of a data service, the system outputs a data service object associated with the data service to a user device, block 108. For example and without limitation, this can include the database system outputting a data service object, which may include all of the data service objects fields, for Data.com®. An example of a data service object and its fields is depicted in FIG. 2 and described below in reference to FIG. 2. A data service object can be a construct that provides a description of information that may be used by a computer.

After outputting a data service object, the system optionally receives a user selection of another data service, block 110. By way of example and without limitation, this can include the user selecting Dun & Bradstreet®.

Having received a selection of another data service, the system optionally outputs another data service object associated with the other data service to a user device, block 112. For example and without limitation, this can include the database system outputting a data service object, which may include all of the data service objects fields, for Dun & Bradstreet®. An example of another data service object and its fields is depicted in FIG. 2 and described below in reference to FIG. 2.

After outputting a data object and its fields and outputting a data service object and its fields, the system receives a user selection of a data field, associated with the data object, and a data service field, associated with the data service object, block 114. By way of example and without limitation, this can include the user selecting the company industry field of the contact object and the employer industry field of the Data.com® data service object. A data field can be a part of a record, representing an item of information. A data service field can be a part of a record, representing an item of information.

Having received selections of a data object field and a data service object field, the system stores metadata that maps between the data field, associated with the data object, and the data service field, associated with the data service object, block 116. In embodiments, this can include the database system storing the metadata that maps between the company industry field for the contact object and the employer industry field for Data.com®. Metadata can be a set of information that describes other information.

After storing metadata that maps between the data field and the data service field, the system optionally receives a user selection of another data field, associated with the data object, and another data service field, associated with another data service object, block 118. For example and without limitation, this can include the user selecting the company revenue field of the contact object and the employer revenue field of the Dun & Bradstreet® data service object. Examples of other data object fields and other data service object fields are depicted in FIG. 2 and described below in reference to FIG. 2.

Having received selections of another data object field and another data service object field, the system optionally stores metadata that maps between the other data field, associated with the data object, and the other data service field, associated with the other data service object, block 120. In embodiments, this can include the database system storing the metadata that maps between the company revenue field for the contact object and the employer revenue field for Dun & Bradstreet®. Examples of other mappings between data object fields and data service object fields are depicted in FIG. 2 and described below in reference to FIG. 2. Although these examples describe the database system storing metadata that maps the fields of a data object to fields of two different data services' data service objects, the database system may store metadata that maps the fields of a data object to fields of any number of different data services' data service objects.

Storing metadata that maps between a data field and a data service field may include mapping from the data field to the data service field, calculating a confidence score based on reverse mapping from the data service field to the data field, and mapping from the data service field to the data field in response to a determination that the confidence score meets a specified threshold. For example, the database system may store metadata that maps from a company revenue field of a data object to an employer revenue field of a data service object, calculate a 95% confidence score based on the reverse mapping from the employer revenue field to the company revenue field, and store metadata that maps from the employer revenue field to the company revenue field because the 95% confidence score exceeds a threshold of 80% for automatic reverse mapping. This automatic reverse mapping may save a database user a significant amount of time by eliminating the need to create reverse mapping in the reverse direction of the mapping that was just selected by the database user. The database system may notify the database user about each automatic reverse mapping on an individual or collective basis, and the database user may have the option to accept each automatic reverse mapping on an individual or collective basis, or reject each automatic reverse mapping on an individual or collective basis.

Storing metadata that maps between a data field and a data service field may include verifying a compatibility between the data field and the data service field. For example, the database system can verify that a user's selections to map from a company revenue field of a data object to an employer revenue field of a data service object creates an incompatibility because the company revenue field is stored in a text format while the employer revenue field is stored in a numeric format. The database system may respond to identifying such an incompatibility by outputting an incompatibility message to the database user who made the corresponding selections, and/or by generating a correction for the incompatibility, such as by applying a format conversion that converts text in the company revenue field to numbers in the employer revenue field. If the database system generates a correction for an incompatibility, the database system may also generate a corresponding correction for the reverse mapping, such as by applying a format conversion that converts numbers in the employer revenue field to text in the company revenue field.

After storing metadata that maps between fields in the data object and the data service objects, a transformation object is created that transforms a value associated with the data field into a value associated with the data service field, or the value associated with the data service field into the value associated with the data field, in response to receiving user input, block 122. For example and without limitation, this can include the database system receiving Apex code that transforms the standard industrial classification (SIC) numeric value of "7372" for the employer industry field into the text value of "Prepackaged Software" for the company industry field.

Although this example describes the transformation object as Apex code, the transformation object can be based on any code, formula, or expression builder. While this example describes an employer industry field that stores one standard industrial classification value, each data service object field can store multiple values. The same transformation object can be reused across multiple objects, such as using the Apex code to transform the standard industrial classification numeric values for multiple data services objects into textual values for a contact object, a lead object, an opportunity object, and an account object. Other examples of transforming include transforming "7371" to "Computer Programming Services," and "7373" to "Computer Integrated Systems Design." Although these examples describe transformations that transform a numeric value into a textual value, these transformations are more than any formatting transformation. For example, transforming a numeric value "7372" into a textual value of "7372" would be a format transformation of the same content from a number into text, while transforming a numeric value "7372" into a textual value of "Prepackaged Software" is a transformation that is a content transformation which is more than a format transformation. A transformation object can be a construct that converts one figure, expression, or function into another that is equivalent in some respect but is differently expressed or represented. A value can be a symbol that represents a textual expression or the numerical amount denoted by an algebraic term; a magnitude, quantity, or number.

The transforming can conditionally transform a value associated with the data field or the data service field into a value associated with another data service field or another data field. For example, the database system receives Apex code that responds to the conditional absence of any value in the company field by extracting the domain name "acme" from the value "jsmith@acme.com" for the email address field in the data object to transform the domain "acme" into the value "acme" for the employer field in the data service object. This conditional transformation requires the prior conditional mapping of the email address field in the data object to the employer field in the data service object. This conditional transformation can enable the matching of a data object with a data service object. For example, an instance of the data object stores only the value "John Smith" for the name field and the value "jsmith@acme.com" for the email address field. The matching of the data object's values with a manageable number of data service object's values may not be possible if there is no match for the email address field's value in the data service object because the common names of "John" and "Smith" could result in too many potential matches. However, the transformation that extracts "acme" from the email address field value in the data object and uses the extracted domain to match employer field values in the data service object can result in a match with data service object values that correctly identify data for the John Smith who works at Acme. Other examples of cross-field value transformations include extracting the local part of an email address field value in a data object to use as a match with a data service object's name field value, extracting a name field value and a company field value in a data object to use as match with a data service object's email value, and extracting an area code from a phone number field value in a data object, and then transforming the area code to a city value that is used as a match with the data service object's city field value.

Having stored metadata that maps between fields in the data object and the data service objects, another transformation object is optionally created that transforms another value associated with the data field into another value associated with the other data service field, or the other value associated with the other data service field into the other value associated with the data field, in response to receiving user input, block 124. By way of example and without limitation, this can include the database system receiving Apex code that transforms the numeric values of the employer revenue field into the text values of the company revenue field. The transforming can transform a number of values associated with the data field or the data service field into a different number of values associated with the data service field or the data field. For example, the database system transforms 100 million numerical values that are less than $1,000,000.00 to the text value of "Low" for the company revenue field, 400 million numerical values from $1,000,000.00 to $5,000,000.00 to the text value of "Medium" for the company revenue field, and infinite numerical values that are more than $5,000,000.00 to the text value of "High" for the company revenue field.

Following the creation of the transformation object, the system updates an instance of the data object by using the metadata to send request data to the data service, using the metadata to receive response data from the data service, and applying the transformation object, block 126. In embodiments, this can include the user requesting Data.com® to update the contact data, and the database system updating the contact data for Joe Smith of Acme.com by using the metadata to send data identifying Joe Smith to Data.com®, and to receive data, including the employer industry value of "7372" for Acme Corporation, from Data.com®. Then the database system applies the Apex code to transform the employer industry value of 7372 for Acme Corporation into the company industry value of "Prepackaged Software" for Acme Corporation, and updates the contact data for Joe Smith of Acme.com with the company industry value of Prepackaged Software for Acme Corporation.

After the creation of the other transformation object, the system optionally updates the instance of the data object by using the other metadata to send other request data to the other data service, using the other metadata to receive other response data from the other data service, and applying the other transformation object, block 128. For example and without limitation, this can include the user requesting Dun & Bradstreet® to update the contact data, and the database system updating the contact data for Joe Smith of Acme.com by using the metadata to send data identifying Joe Smith to Dun & Bradstreet®, and to receive data, including the employer revenue value of "$4,908,172.63" for Acme Corporation, from Dun & Bradstreet®. Then the database system applies the Apex code to transform the employer revenue value of $4,908,172.63 for Acme Corporation into the company revenue value of "Medium" for Acme Corporation, and updates the contact data for Joe Smith of Acme.com with the company revenue value of Medium for Acme Corporation.

In some embodiments, the metadata mapping from a data object's fields to the fields of one data service's object may differ from the metadata mapping from the same data service object fields to the same fields of the data object. For example, the metadata includes reverse mapping from the telephone field for Data.com® to the contact object's phone number field because the database user expects Data.com® to be the best data service for returning new phone numbers, but the metadata does not include reverse mapping from the email field for Data.com® to the contact object's email address field because the database user does not expect Data.com® to be the best data service for returning new email addresses. Similarly, the metadata includes reverse mapping from the email address field for Dun & Bradstreet® to the contact object's email address field because the database user expects Dun & Bradstreet® to be the best data service for returning new email addresses, but the metadata does not include reverse mapping from the phone field for Dun & Bradstreet® to the contact object's phone number field because the database user does not expect Dun & Bradstreet® to be the best data service for returning new phone numbers. Therefore, through the use of selective reverse mapping, a database user may select which data services update which data object fields.

If a database user selects not to reverse map from a data service object field to a data object field, the database user may or may not also map from the data object field to the data service object field. For example, if the metadata does not include reverse mapping from the email field for Data.com® to the contact object email address field, the metadata may also not include mapping from the contact object email address field to the email field for Data.com®. Alternatively, although the metadata does not include reverse mapping from the email field for Data.com® to the contact object email address field, the metadata includes mapping from the contact object email address field to the email field for Data.com® because the database user wants Data.com® to use the contact object email address field to verify the identity of the person corresponding to the contact record, even though the database user does not want to receive any new email addresses from Data.com®.

In another example, Data.com® returns data that includes Joe's phone number and Joe's email address, while Dun & Bradstreet® also returns data that includes Joe's email address and Joe's phone number. For situations like this with competing data, the database system can determine whether the priority for one data service object field is higher than the priority for another data service object field, and update the instance of a data object based on the data service object field with the highest priority. For example, the database system stores the phone number returned from Data.com® because the telephone field for Data.com® has a higher priority than the than the phone field for Dun & Bradstreet®, and stores the email address returned from Dun & Bradstreet® because the email address field for Dun & Bradstreet® has a higher priority than the than the email field for Data.com®.

If the user selects another data object and/or another data service, the system can output the previously created metadata to a user device. For example, the database user selects an account object, and the database system outputs the metadata that maps the company industry field of the contact object to the employer industry field of the data service object for Data.com® and to the employer industry field of the data service object for Dun & Bradstreet®, which may assist the database user in mapping the company industry field of the account object to the employer industry field of the data service object for Data.com® and to the employer industry field of the data service object for Dun & Bradstreet®.

The database user quickly and easily creates transformation objects that transform the values between the fields of a data object and the data fields used by multiple data services, without the need to create code that remains hard-coded and inflexible when the database user attempts to apply laboriously created code to a different data object-data service combination. In the preceding examples, the transformations enabled a match between an instance of a data object and multiple instances of data service objects, even though the contact object lacked the needed value in the company field. Then the transformations transformed the returned matching data from 7372 and $4,908,172.63 into the user-friendly values Prepackaged Software industry and Medium company revenue.

The method 100 may be repeated as desired. Although this disclosure describes the blocks 102-128 executing in a particular order, the blocks 102-128 may be executed in a different order. In other implementations, each of the blocks 102-128 may also be executed in combination with other blocks and/or some blocks may be divided into a different set of blocks.

FIG. 2 illustrates example objects for value transformations that enable data services to update data objects, under an embodiment. Objects 200 include a contact object 202, which includes contact object fields 204-226, a data service object 228, which includes data service object fields 230-252, and another data service object 254, which includes data service object fields 256-278. Although FIG. 2 depicts one data object that maps to two data service objects, the data object may map to any number of data service objects.

A database user may select the name field 204 of the contact object 202, and then select both the given name field 228 and the family name field 230 of the first data service object 226. These selections result in mapping a split of the name field 204 to the given name field 230 and the family name field 232. Consequently, FIG. 2 depicts the corresponding mapping metadata as the two arrows from the name field 204 to the given name field 230 and the family name field 232. When the database user requests the first third-party data service to update the database system's contact data, this split mapping results in splitting a name stored by the name field 204, such as the name Joe Smith, into a first component for the given name field 230, such as the given name Joe, and a second component for the family name field 232, such as the family name Smith. This splitting enables the third-party data service to identify the name of the person for each specific contact record, which enables the third-party data service to correctly identify data for this person, which may be updated data that the corresponding contact record lacks, and provide this data, including any updated data, to the corresponding contact record. Reverse mapping from the given name field 230 and the family name field 232 to the name field 204 enables the database system to correctly identify the updated data corresponding to the given name field 230 and the family name field 232, identify that the given name field 230 and the family name field 232 correspond to the name field 204, and store the updated data in the correct instance of the contact object 202. Consequently, FIG. 2 depicts the corresponding reverse mapping metadata as the two arrows from the given name field 230 and the family name field 232 to the name field 204.

Similarly, the database user may select the name field 204 of the contact object 202, and then select both the given name field 256 and the family name field 258 of the other data service object 254. These selections result in mapping a split of the name field 204 to the given name field 256 and the family name field 258. Consequently, FIG. 2 depicts the corresponding mapping metadata as the two arrows from the name field 204 to the given name field 256 and the family name field 258. When the database user requests the other third-party data service to update the database system's contact data, this split mapping results in splitting a name stored by the name field 204, such as the name Joe Smith, into a first component for the given name field 256, such as the given name Joe, and a second component for the family name field 258, such as the family name Smith. This splitting enables the other third-party data service to identify the name of the person for each specific contact record, which enables the other third-party data service to correctly identify data for this person, which may be updated data that the corresponding contact record lacks, and provide this data, including any updated data, to the corresponding contact record.

Reverse mapping from the given name field 256 and the family name field 258 to the name field 204 enables the database system to correctly identify the updated data corresponding to the given name field 256 and the family name field 258, identify that the given name field 256 and the family name field 258 correspond to the name field 204, and store the updated data in the correct instance of the contact object 202. Consequently, FIG. 2 depicts the corresponding reverse mapping metadata as the two arrows from the given name field 256 and the family name field 258 to the name field 204. Although these examples describe the database system splitting one field in a data object to two fields in each of the data service objects, the database system may split one field in a data object to two fields in one of the data service objects while maintaining a one-to-one correspondence between the one field in the data object to one matching field in another one of the data service objects.

A database user may select the title field 206 of the contact object 202, and then select the job title field 234 of the data service object 228 and the title field 260 of the other data service object 254. These selections result in a mapping from the title field 206 to the job title field 234 and to the title field 260. Consequently, FIG. 2 depicts the corresponding mapping metadata as the arrow from the title field 206 to the job title field 234 and the arrow from the title field 206 to the title field 260. This mapping enables the third-party data services to verify the identity of the person for each specific contact record, which enables the third-party data services to correctly identify data for this person, which may be updated data that the corresponding contact record lacks, and provide this data, including any updated data, to the corresponding contact record. Reverse mapping from the job title field 236 and the title field 260 to the title field 206 enables the database system to verify the identity of the person for the updated data, and store the updated data in the correct instance of the contact object 202. Consequently, FIG. 2 depicts the corresponding reverse mapping metadata as the arrow from the job title field 234 to the title field 206 and the arrow from the title field 260 to the title field 206.

A database user may select both the street address 1 field 210 and the street address 2 field 212 of the contact object 202, and then select the street address field 238 of the data service object 228. These selections result in mapping a merge of the street address 1 field 210 and the street address 2 field 212 to the street address field 238. Consequently, FIG. 2 depicts the corresponding mapping metadata as the two arrows from the street address 1 field 210 and the street address 2 field 212 to the street address field 238. When the database user requests the third-party data service to update the database system's contact data, this merged mapping results in merging an address stored by the street address 1 field 210, such as the address One Market Street, and an address stored by the street address 2 field 212, such as the address Suite 300, into an address stored by the street address field 238, such as the address One Market Street, Suite 300. This merging enables the third-party data service to identify the address of the person for each specific contact record, which enables the third-party data service to correctly identify data for this person, which may be updated data that the corresponding contact record lacks, and provide this data, including any updated data, to the corresponding contact record.

Reverse mapping from the street address field 238 to the street address 1 field 210 and the street address 2 field 212 enables the database system to correctly identify the updated data corresponding to the street address field 238, identify that street address field 238 corresponds to the street address 1 field 210 and the street address 2 field 212, and store the updated data in the correct instance of the contact object 202. Consequently, FIG. 2 depicts the corresponding reverse mapping metadata as the two arrows from the street address field 238 to the street address 1 field 210 and the street address 2 field 212.

Similarly, the database user may select both the street address 1 field 210 and the street address 2 field 212 of the contact object 202, and then select the street address field 264 of the other data service object 254. These selections result in mapping a merge of the street address 1 field 210 and the street address 2 field 212 to the street address field 264. Consequently, FIG. 2 depicts the corresponding mapping metadata as the two arrows from the street address 1 field 210 and the street address 2 field 212 to the street address field 264. When the database user requests the other third-party data service to update the database system's contact data, this merged mapping results in merging an address stored by the street address 1 field 210, such as the address One Market Street, and an address stored by the street address 2 field 212, such as the address Suite 300, into an address stored by the street address field 264, such as the address One Market Street, Suite 300. This merging enables the other third-party data service to identify the address of the person for each specific contact record, which enables the other third-party data service to correctly identify data for this person, which may be updated data that the corresponding contact record lacks, and provide this data, including any updated data, to the corresponding contact record.

Reverse mapping from the street address field 264 to the street address 1 field 210 and the street address 2 field 212 enables the database system to correctly identify the updated data corresponding to the street address field 264, identify that street address field 264 corresponds to the street address 1 field 210 and the street address 2 field 212, and store the updated data in the correct instance of the contact object 202. Consequently, FIG. 2 depicts the corresponding reverse mapping metadata as the two arrows from the street address field 260 to the street address 1 field 210 and the street address 2 field 212. Although these examples describe the database system merging two fields in a data object to one field in each of the data service objects, the database system may merge two fields in a data object to one field in one of the data service objects while maintain a one-to-one correspondence between the two fields in the data object and two matching fields in another one of the data service objects.

Although FIG. 2 depicts a data object as including data fields, the data object may be associated with any of its data fields via a corresponding foreign key. For example, the name field 204 may store a foreign key instead of storing a name itself, and the foreign key references a primary key in a name object that includes fields for a prefix, a given name, a middle name, a family name, a suffix, and an honorific title.

System Overview

Figure 3:
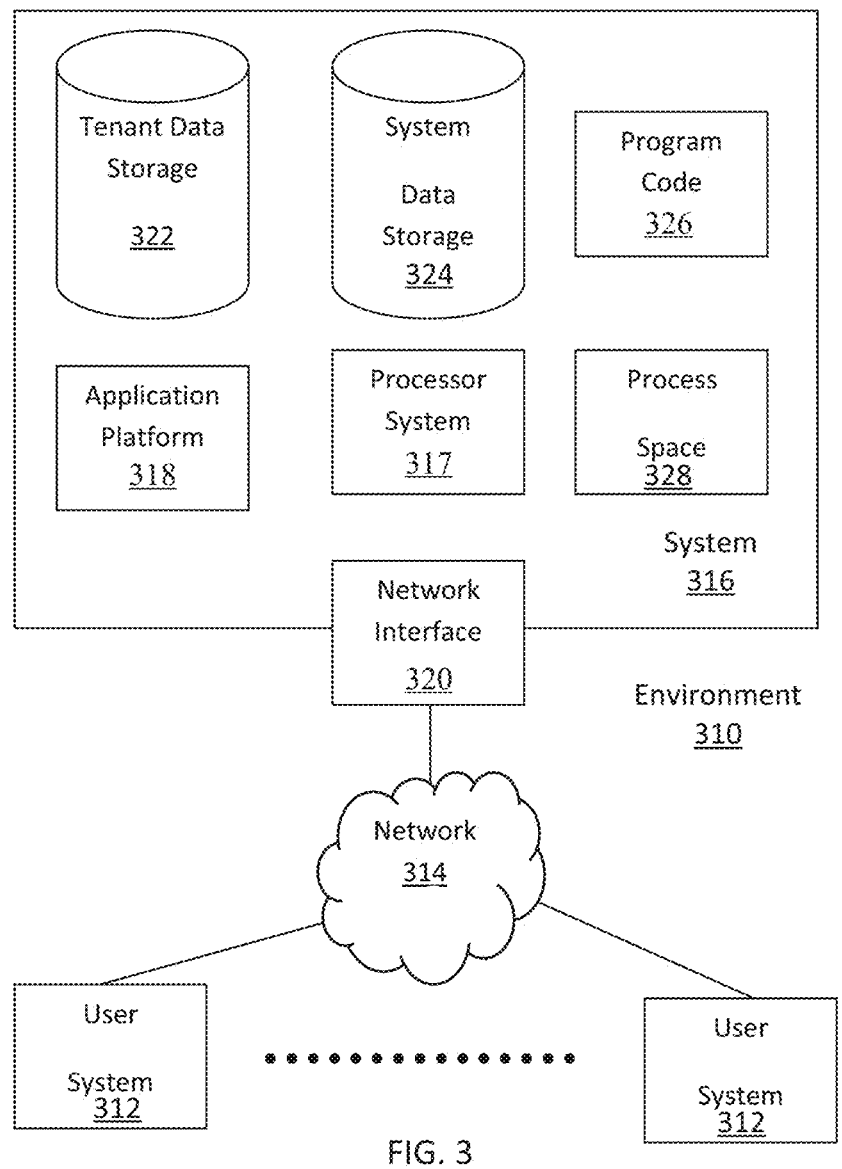
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
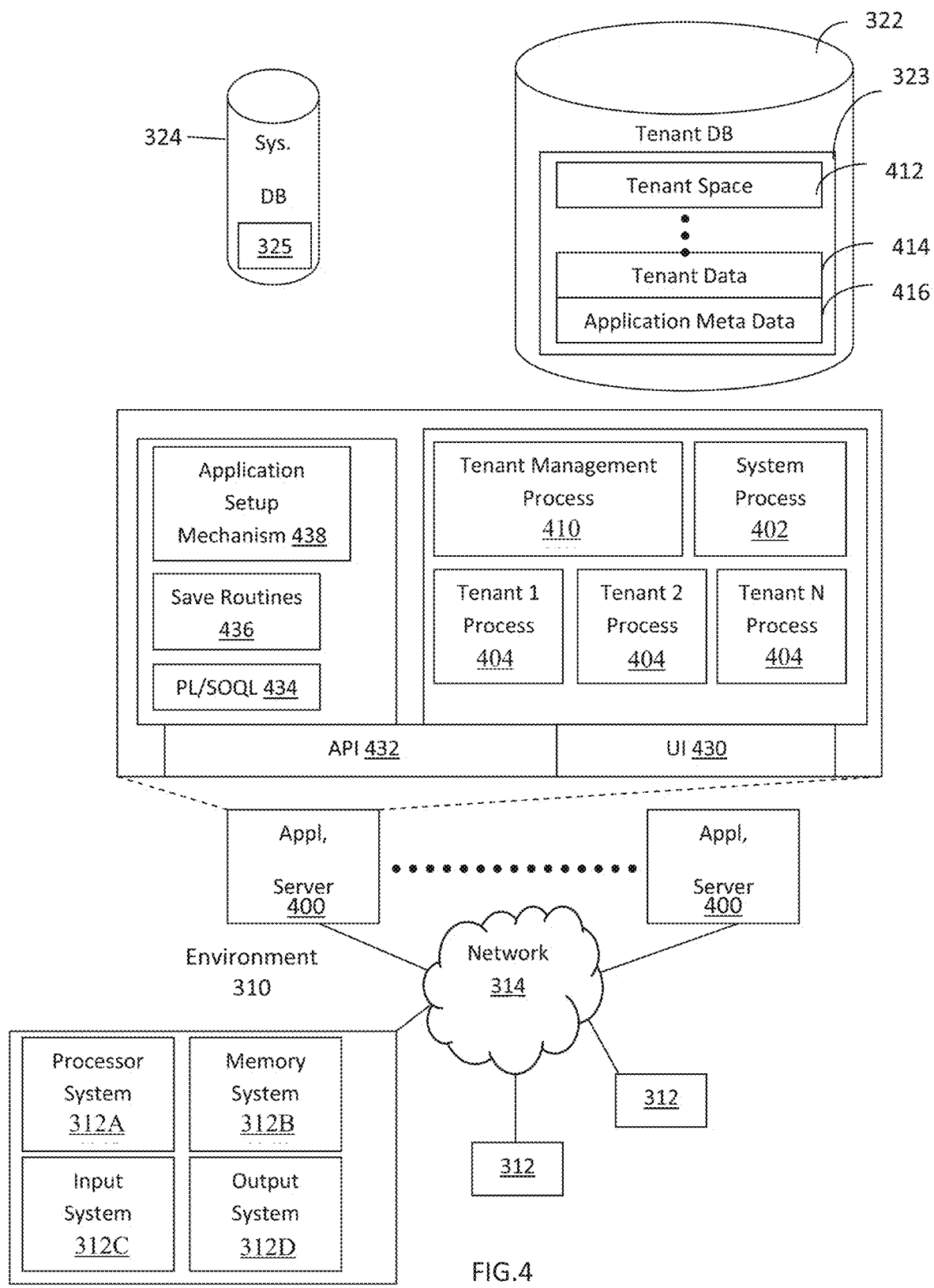
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:
1. A system comprising:
one or more processors; and
a non-transitory computer readable medium storing a plurality of instructions, which when executed, cause the one or more processors to:
output a list of data field names associated with a data object in response to receiving an explicit selection by a user to display the list of data field names associated with the data object;
output a list of data service field names associated with a data service object in response to receiving explicit selections by the user of a data service and the data service object, the data service object being associated with the data service;

store metadata that includes (1) a mapping between a data field which corresponds to a data field name that is explicitly selected by the user from the outputted list of data field names and a data service field which corresponds to a data service field name that is explicitly selected by the user from the list of outputted data service field names and (2) a reverse mapping between the data service field which corresponds to the data service field name that is explicitly selected by the user and the data field which corresponds to the data field name that is explicitly selected by the user when the reverse mapping has a confidence score above a threshold value;

create a transformation object that transforms one of: i) a value associated with the data field into a value associated with the data service field, and ii) the value associated with the data service field into the value associated with the data field; and update an instance of the data object by: i) using the metadata and a plurality of field names that are in both the outputted list of data field names and the outputted list of data service field names to send the instance of the data object to the data service, ii) using the metadata and the plurality of field names that are in both the outputted list of data field names and the outputted list of first data service field names to receive the instance of the data service object from the data service, and iii) apply the transformation object to transform a value of the data service field into a value of the data field; and to update the instance of the data object with corresponding data in the instance of the data service object.

2. The system of claim 1, comprising further instructions, which when executed, cause the one or more processors to:

output, in response to receiving explicit selections by the user of another data service and another data service object associated with the other data service, a list of other data service object field names associated with the other data service object;

store, in response to receiving an explicit selection by the user of another data field name associated with the data object and an explicit selection by the user of another data service field name associated with the other data service object, other metadata that maps between another data field which corresponds to the other data field name and another data service field which corresponds to the other data service field name;

create another transformation object that transforms one of: i) another value associated with the other data field into another value associated with the other data service field, and ii) the other value associated with the other data service field into the other value associated with the other data field; and update an instance of the data object by: i) using the other metadata and a plurality of field names that are in both the outputted list of data field names and the outputted list of other data service field names to send the instance of the data object to the other data service, by ii) using the other metadata and the plurality of field names that are in both the outputted list of data field names and the outputted list of other data service field names to receive the instance of the other data service object from the other data service, and iii) apply the transformation object to transform a value of the other data service field into a value of the other data field; and to update the instance of the data object with corresponding data in the instance of the other data service object.

3. The system of claim 1, wherein the confidence score is based on the reverse mapping from the data service field to the data field.

4. The system of claim 1, wherein the metadata comprises at least one of metadata that maps between the data field and a combination of the data service field and another data service field associated with the data service object, and metadata that maps between a combination of the data field and another data field associated with the data object and the first data service field.

5. The system of claim 1, wherein the transforming transforms a number of values associated with one of the data field and the data service field into a different number of values associated with one of the data service field and the data field.

6. The system of claim 1, wherein the transforming conditionally transforms a value associated with one of the data field and the data service field into a value associated with one of another data service field and another data field.

7. The system of claim 2, wherein the data field comprises the other data field, and updating the instance of the data object comprises determining whether a priority associated with the data service field is higher than another priority associated with the other data service field, updating the instance of the data object based on the data service field in response to a determination that the priority associated with the data service field is higher than the other priority associated with the other data service field, and updating the instance of the data object based on the other data service field in response to a determination that the priority associated with the data service field is not higher than the other priority associated with the other data service field.

8. A computer program product comprising computer-readable program code to be executed by one or more processors when retrieved from a non-transitory computer-readable medium, the program code including instructions to:

output a list of data field names associated with a data object in response to receiving an explicit selection by a user to display the list of data field names associated with the data object;

output a list of data service field names associated with a data service object in response to receiving explicit selections by the user of a data service and the data service object, the data service object being associated with the data service;

store metadata that includes (1) a mapping between a data field which corresponds to a data field name that is explicitly selected by the user from the outputted list of data field names and a data service field which corresponds to a data service field name that is explicitly selected by the user from the list of outputted data service field names and (2) a reverse mapping between the data service field which corresponds to the data service field name that is explicitly selected by the user and the data field which corresponds to the data field name that is explicitly selected by the user when the reverse mapping has a confidence score above a threshold value;

create a transformation object that transforms one of: i) a value associated with the data field into a value associated with the data service field, and ii) the value associated with the data service field into the value associated with the data field; and update an instance of the data object by: i) using the metadata and a plurality of field names that are in both the outputted list of data field names and the outputted list of data service field names to send the instance of the data object to the data service, ii) using the metadata and the plurality of field names that are in both the outputted list of data field names and the outputted list of first data service field names to receive the instance of the data service object from the data service, and iii) apply the transformation object to transform a value of the data service field into a value of the data field; and to update the instance of the data object with corresponding data in the instance of the data service object.

9. The computer program product of claim 8, wherein the program code comprises further instructions to:
output, in response to receiving explicit selections by the user of another data service and another data service object associated with the other data service, a list of other data service object field names associated with the other data service object;
store, in response to receiving an explicit selection by the user of another data field name associated with the data object and an explicit selection by the user of another data service field name associated with the other data service object, other metadata that maps between another data field which corresponds to the other data field name and another data service field which corresponds to the other data service field name;
create another transformation object that transforms one of: i) another value associated with the other data field into another value associated with the other data service field, and ii) the other value associated with the other data service field into the other value associated with the other data field; and
update an instance of the data object by: i) using the other metadata and a plurality of field names that are in both the outputted list of data field names and the outputted list of other data service field names to send the instance of the data object to the other data service, by ii) using the other metadata and the plurality of field names that are in both the outputted list of data field names and the outputted list of other data service field names to receive the instance of the other data service object from the other data service, and iii) apply the transformation object to transform a value of the other data service field into a value of the other data field; and to update the instance of the data object with corresponding data in the instance of the other data service object.

10. The computer program product of claim 8, wherein the confidence score is based on the reverse mapping from the data service field to the data field.

11. The computer program product of claim 8, wherein the metadata comprises at least one of metadata that maps between the data field and a combination of the data service field and another data service field associated with the data service object, and metadata that maps between a combination of the data field and another data field associated with the data object and the first data service field.

12. The computer program product of claim 8, wherein the transforming transforms a number of values associated with one of the data field and the data service field into a different number of values associated with one of the data service field and the data field.

13. The computer program product of claim 8, wherein the transforming conditionally transforms a value associated with one of the data field and the data service field into a value associated with one of another data service field and another data field.

14. The computer program product of claim 9, wherein the data field comprises the other data field, and updating the instance of the data object comprises determining whether a priority associated with the data service field is higher than another priority associated with the other data service field, updating the instance of the data object based on the data service field in response to a determination that the priority associated with the data service field is higher than the other priority associated with the other data service field, and updating the instance of the data object based on the other data service field in response to a determination that the priority associated with the data service field is not higher than the other priority associated with the other data service field.

15. A method comprising:
outputting, by a database system, a list of data field names associated with a data object in response to receiving an explicit selection by a user to display the list of data field names associated with the data object;
outputting, by the database system, a list of data service field names associated with a data service object in response to receiving explicit selections by the user of a data service and the data service object, the data service object being associated with the data service;
storing, by the database system, metadata that includes (1) a mapping between a data field which corresponds to a data field name that is explicitly selected by the user from the outputted list of data field names and a data service field which corresponds to a data service field name that is explicitly selected by the user from the list of outputted data service field names and (2) a reverse mapping between the data service field which corresponds to the data service field name that is explicitly selected by the user and the data field which corresponds to the data field name that is explicitly selected by the user when the reverse mapping has a confidence score above a threshold value;
creating, by the database system, a transformation object that transforms one of: i) a value associated with the data field into a value associated with the data service field, and ii) the value associated with the data service field into the value associated with the data field; and
updating, by the database system, an instance of the data object by: i) using the metadata and a plurality of field names that are in both the outputted list of data field names and the outputted list of data service field names to send the instance of the data object to the data service, ii) using the metadata and the plurality of field names that are in both the outputted list of data field names and the outputted list of first data service field names to receive the instance of the data service object from the data service, and iii) apply the transformation object to transform a value of the data service field into a value of the data field; and to update the instance of the data object with corresponding data in the instance of the data service object.

16. The method of claim 15, wherein the method further comprises:
outputting, by the database system in response to receiving explicit selections by the user of another data service and another data service object associated with the other data service, a list of other data service object field names associated with the other data service object;

storing, by the database system in response to receiving an explicit selection by the user of another data field name associated with the data object and an explicit selection by the user of another data service field name associated with the other data service object, other metadata that maps between another data field which corresponds to the other data field name and another data service field which corresponds to the other data service field name;

creating, by the database system, another transformation object that transforms one of: i) another value associated with the other data field into another value associated with the other data service field, and ii) the other value associated with the other data service field into the other value associated with the other data field; and updating, by the database system, an instance of the data object by: i) using the other metadata and a plurality of field names that are in both the outputted list of data field names and the outputted list of other data service field names to send the instance of the data object to the other data service, by ii) using the other metadata and the plurality of field names that are in both the outputted list of data field names and the outputted list of other data service field names to receive the instance of the other data service object from the other data service, and iii) apply the transformation object to transform a value of the other data service field into a value of the other data field; and to update the instance of the data object with corresponding data in the instance of the other data service object.

17. The method of claim 15, wherein the confidence score is based on the reverse mapping from the data service field to the data field.

18. The method of claim 15, wherein the metadata comprises at least one of metadata that maps between the data field and a combination of the data service field and another data service field associated with the data service object, and metadata that maps between a combination of the data field and another data field associated with the data object and the first data service field.

19. The method of claim 15, wherein the transforming at least one of transforms a number of values associated with one of the data field and the data service field into a different number of values associated with one of the data service field and the data field, and conditionally transforms a value associated with one of the data field and the data service field into a value associated with one of another data service field and another data field.

20. The method of claim 16, wherein the data field comprises the other data field, and updating the instance of the data object comprises determining whether a priority associated with the data service field is higher than another priority associated with the other data service field, updating the instance of the data object based on the data service field in response to a determination that the priority associated with the data service field is higher than the other priority associated with the other data service field, and updating the instance of the data object based on the other data service field in response to a determination that the priority associated with the data service field is not higher than the other priority associated with the other data service field.

* * * * *